(12) United States Patent
Eudier et al.

(10) Patent No.: US 9,303,995 B2
(45) Date of Patent: Apr. 5, 2016

(54) GYROSCOPIC SENSOR

(75) Inventors: Jean-Baptiste Eudier, Paris (FR); Christophe Maerky, Paris (FR); Thierry Bonjour, Paris (FR)

(73) Assignee: Sagem Defense Securite, Paris (FR)

( * ) Notice: Subject to any disclaimer, the term of this patent is extended or adjusted under 35 U.S.C. 154(b) by 755 days.

(21) Appl. No.: 13/509,523

(22) PCT Filed: Nov. 10, 2010

(86) PCT No.: PCT/EP2010/067217
§ 371 (c)(1),
(2), (4) Date: May 11, 2012

(87) PCT Pub. No.: WO2011/058060
PCT Pub. Date: May 19, 2011

(65) Prior Publication Data
US 2012/0227497 A1    Sep. 13, 2012

Related U.S. Application Data

(60) Provisional application No. 61/324,552, filed on Apr. 15, 2010.

(30) Foreign Application Priority Data

Nov. 12, 2009 (FR) ...................................... 09 05428

(51) Int. Cl.
*G01C 19/56* (2012.01)
*G01C 19/5691* (2012.01)

(52) U.S. Cl.
CPC .................................. *G01C 19/5691* (2013.01)

(58) Field of Classification Search
CPC ........... G01C 19/5691; G01C 19/5677; G01C 19/5719; G01C 19/56; G01P 19/5684
USPC .............................. 73/504.13, 504.12, 504.04
See application file for complete search history.

(56) References Cited

U.S. PATENT DOCUMENTS

| 3,680,391 | A | * | 8/1972 | Denis ......................... 73/504.13 |
| 4,068,533 | A | * | 1/1978 | Ferriss ......................... 74/5.6 D |
| 5,218,867 | A | * | 6/1993 | Varnham et al. ........... 73/504.13 |
| 5,712,427 | A | * | 1/1998 | Matthews .................. 73/504.04 |
| 6,662,656 | B2 | * | 12/2003 | Jeanroy ....................... 73/504.02 |
| 7,267,003 | B2 | | 9/2007 | Hiraoka et al. |
| 7,281,425 | B2 | * | 10/2007 | Chikovani et al. ......... 73/504.13 |

(Continued)

FOREIGN PATENT DOCUMENTS

FR          2805039          8/2001

OTHER PUBLICATIONS

International Search Report and Written Opinion for Application No. PCT/EP2010/067217, dated Jan. 10, 2011, 7 pgs.

*Primary Examiner* — Helen Kwok
(74) *Attorney, Agent, or Firm* — Patterson Thuente Pedersen, P.A.

(57) ABSTRACT

The invention relates to an gyroscopic sensor comprising a sensitive element designed to vibrate; an electrode carrier capable of carrying excitation/detection electrodes for exciting the sensitive element and for detecting the vibration of the sensitive element; and elements for supporting the electrode carrier. The supporting elements comprise a base made of a material having a density of less than $5 \text{ kg/dm}^3$, and the square root of the ratio of Young's modulus divided by said density is greater than $9 \text{ GPa}^{1/2}.\text{dm}^{3/2}/\text{kg}^{-1/2}$.

17 Claims, 3 Drawing Sheets

(56) References Cited

U.S. PATENT DOCUMENTS

| | | |
|---|---|---|
| 7,281,426 B1 * | 10/2007 | Chikovani et al. ......... 73/504.13 |
| 7,607,350 B2 | 10/2009 | Choi |
| 2003/0010120 A1 * | 1/2003 | Jeanroy ..................... 73/504.02 |
| 2005/0066724 A1 | 3/2005 | Hiraoka |
| 2006/0096376 A1 * | 5/2006 | Renault ..................... 73/504.12 |
| 2009/0031831 A1 * | 2/2009 | Stewart ....................... 74/5.6 D |

* cited by examiner

GYROSCOPIC SENSOR

PRIORITY CLAIM

The present application is a National Phase entry of PCT Application No. PCT/EP2010/067217, filed Nov. 10, 2010, which claims priority from French Application Number 09 05428, filed Nov. 12, 2009, and U.S. patent application Ser. No. 61/324,552, filed Apr. 15, 2010, the disclosures of which are hereby incorporated by reference herein in their entirety.

FIELD OF THE INVENTION

The present invention relates generally to gyroscope sensors and in particular to gyroscopic sensors less influenced by the mechanical parasitic vibration mode.

BACKGROUND OF THE INVENTION

The present invention relates to a gyroscopic sensor comprising:
    a sensitive element suitable designed to vibrate;
    an electrode carrier capable of carrying excitation electrodes and detection electrodes for detecting the vibration of the sensitive element; and
    elements for supporting the electrode carrier.
    The elements for supporting the electrode carrier comprise a base and a decoupling element interposed between the base and the electrode carrier. The decoupling element is designed to decouple the electrode carrier and the sensitive element relative to the dimensional variations of the base that are brought about by the thermal variations to which the sensor is subjected. For example, it comprises support rods for the electrode carrier that are designed to pass right through the base in order to transport signals between the electrodes and an electronic circuit, as described in patent application FR 2 805 039.
    Such a sensor is generally fastened to a support, called an inertial core. This inertial core is then integrated into an inertial measurement system with which a carrier, liable to vibrate or receive a shock, is equipped. Since the sensor is firmly attached to the inertial core, it may undergo these vibrations during use of the carrier. The sensitive element vibration modes induced by the vibrations of the carrier are hereafter named parasitic vibration modes.
    In order not to amplify the vibrations coming from the carrier, the base of such a sensor is generally made of a stiff material. For example, the base is a metal plate 10 mm in thickness having a mass of about 70 g. Therefore, the inertial sensor is heavy and bulky.
    The inertial information relative is included in a frequency range of one hundred Hertz, located on both sides of the vibratory resonance frequency of the gyroscope sensor. The inertial information comprises information relative to the angle of rotation or to the rotation speed of the gyroscopic sensor's carrier. The vibratory resonance frequency of the gyroscope sensor is hereafter named "useful" vibration mode. The interferences between the mechanical parasitic vibration modes and the "useful" vibration mode damage the performance of the gyroscopic sensor.
    To guaranty optimal performance of the gyroscopic sensor, it is desirable to provide a gyroscope sensor having a first parasitic vibration mode situated far from the "useful" vibration mode.

SUMMARY OF THE INVENTION

One object of the invention is in particular to provide a lightweight and compact gyroscopic sensor which is less influenced by the mechanical parasitic vibration mode.

Another object of the invention is to provide a gyroscopic sensor for obtaining a more precise rotation angle measurement.

A further object of the invention is to provide a gyroscopic sensor having a sealed base through which electrical connections pass.

For this purpose, the subject of the invention is a gyroscopic sensor comprising:
    a sensitive element suitable for vibrating;
    an electrode carrier capable of carrying electrodes for exciting the sensitive element and for detecting the vibration of the sensitive element; and
    elements for supporting the electrode carrier;
    the sensor being noteworthy in that the supporting elements comprise a base made of a material having a density of less than 5 kg/dm$^3$, and the square root of the ratio of Young's modulus divided by said density is greater than 9 GPa$^{1/2}$ dm$^{3/2}$kg$^{-1/2}$.

According to particular embodiments, the gyroscopic sensor has one or more of the following features:
    the material of which the base is made has a density being between 1.5 kg/dm$^3$ and 5 kg/dm$^3$, and the square root of the ratio of Young's modulus divided by said density is between 9 Gpa$^{1/2}$dm$^{3/2}$kg$^{-1/2}$ and 12 GPa$^{1/2}$dm$^{3/2}$kg$^{-1/2}$;
    said material comprises beryllium;
    said material comprises a ceramic;
    the ceramic is alumina;
    the ceramic is cofired;
    the base is produced by the high-temperature cofiring of ceramic layers and integrated electrical connections;
    the base is produced by the low-temperature cofiring of ceramic layers and integrated electrical connections;
    the gyroscopic sensor according to the invention includes electrical connections integrated into the base and an electronic circuit electrically connected to the electrical connections;
    the supporting elements comprise conducting support rods interposed between the base and the electrode carrier, said support rods being, on one side, soldered to electrical contacts of the electrical connections and, on the other side, connected to the excitation/detection electrodes of the electrode carrier;
    the gyroscopic sensor according to the invention includes a package for protecting the electronic circuit soldered to the base;
    the base includes, integrated therein, an array of pins emerging on the inside of the package and an array of additional pins emerging on the outside of the package, and in which at least some of said electrical connections of the base are capable of interconnecting the array of pins to the array of additional pins;
    the sensor according to the invention is designed to be fastened to an inertial core, said sensor comprising:
        a guard ring deposited on the electrode carrier; and
        electrical connection means for connection between said
            guard ring and either the electronic circuit or said package, or both these components, said electrical connection means being connected to the electrical ground of the inertial core;
    the gyroscopic sensor according to the invention is designed to be fastened to an inertial core, said sensor comprising a cover fastened to the base, said cover being connected to the electrical ground of the inertial core;
    said gyroscopic sensor includes at least one elastic electrical coupler along an axial direction, said coupler being placed between the electrode carrier and the base; and
    said gyroscopic sensor is designed to be fastened to an inertial core via four fastening elements.

BRIEF DESCRIPTION OF THE DRAWINGS

The invention will be better understood on reading the following description, given solely by way of example and with reference to the drawings, in which.

The invention is described in relation to a gyroscopic sensor having a resonator of bell shape or spherical cap shape. However, the invention could also be applied to any other type of inertial sensor and especially to an accelerometer.

DETAILED DESCRIPTION OF THE DRAWINGS

Figure 1:
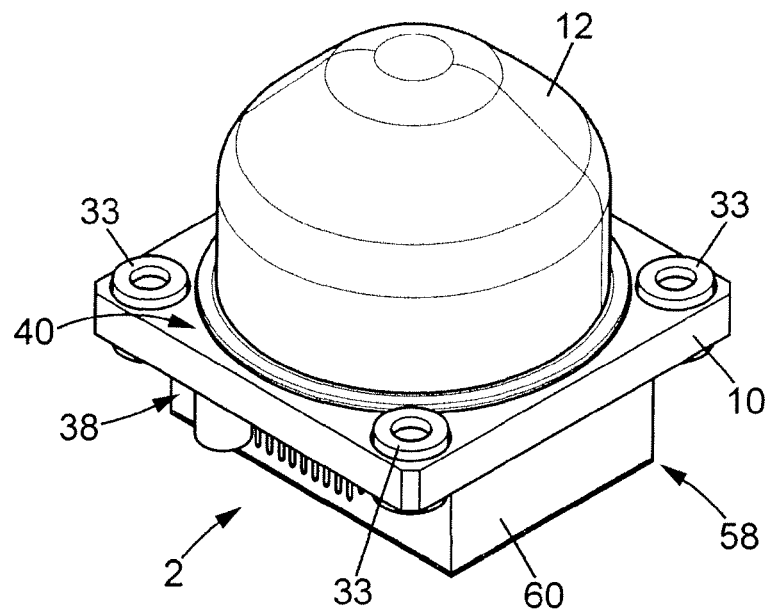
FIG. 1 is a perspective view of an gyroscopic sensor according to the invention.
Figure 2:
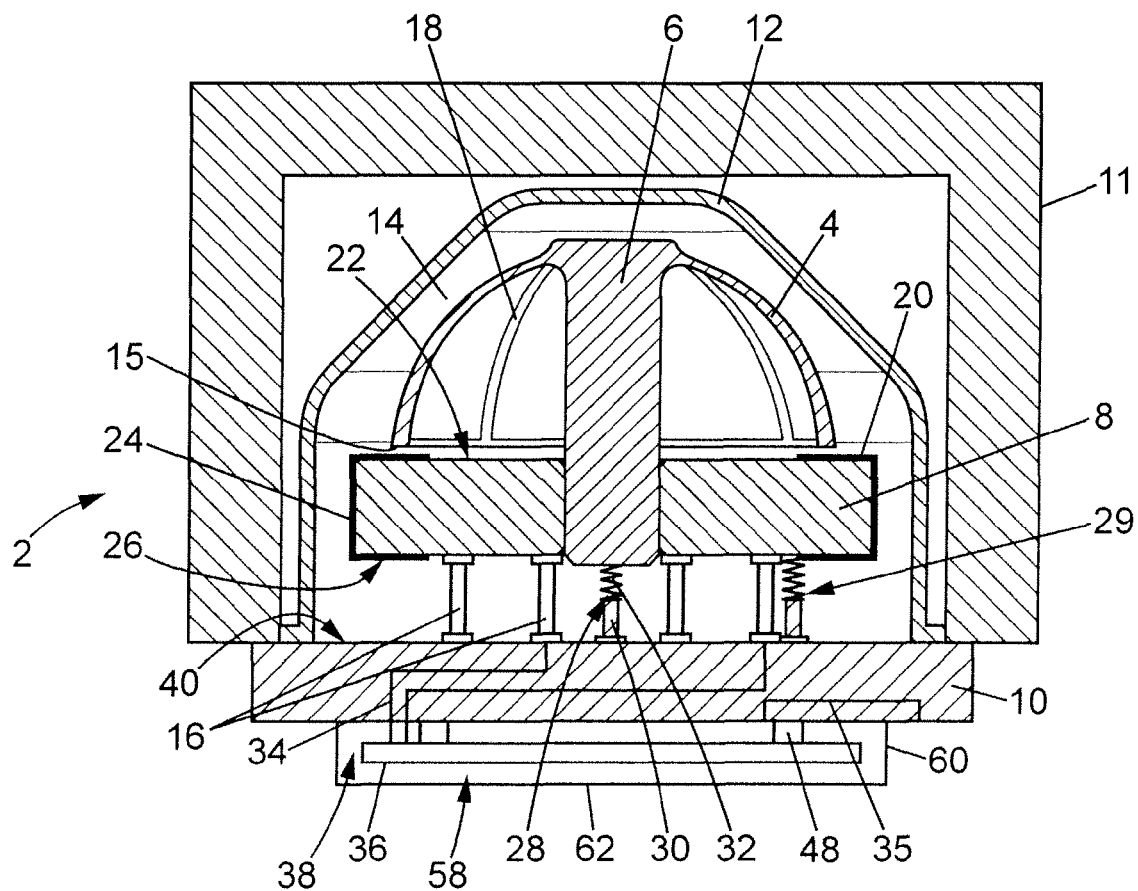
FIG. 2 is an axial sectional view of the gyroscopic sensor illustrated in FIG. 1.

Referring to FIGS. 1 and 2, the gyroscopic sensor 2 according to the invention comprises:

a sensitive element, called hereinafter resonator 4, which may especially be of hemispherical shape, as illustrated, and which has a shaft 6 for fastening it;

a part carrying the electrodes necessary for operating the resonator 4, hereinafter called electrode carrier 8, in which the shaft 6 of the resonator 4 is anchored;

a base 10 for fastening the gyroscopic sensor to a support, called inertial core 11; and a cover 12 fastened to the base 10 and forming, with the latter, a vacuum-sealed chamber 14 containing the electrode carrier 8 and the resonator 4. A getter is placed in the chamber 14 in order to adsorb the residual particles or gases that are liable to impair the quality of the vacuum in said sealed chamber.

The electrode carrier 8 may have various configurations. It may be flat, with electrodes placed facing the end face 15 of the resonator 4, as illustrated in FIG. 2. It may also be hemispherical, with electrodes placed facing the internal face of the resonator. This configuration is not illustrated.

The electrode carrier 8 is supported by eight conducting support rods 16 supported by the base 10.

The support rods 16 are designed to deform elastically in the case of differential thermal expansion of the electrode carrier 8 with the base 10 or in the case of an acceleration or a shock parallel to the plane of the base 10.

The lower end of the support rods 16 is soldered to the base 10. This soldering is carried out between two plane surfaces at a perfectly defined place so that it is possible for the vibration frequencies of the support rods to be known precisely, so as to eliminate their parasitic vibration by digital filtering.

The end face 15 and the outer edge 15A of the resonator 4 are metalized. They are designed to be at a predefined potential. For this purpose, the inner surface of the resonator 4 and the shaft 6 have an electrical connection 18 to the end face 15.

The electrical connection 18 is linked to a first electrical coupler 28 located approximately under the shaft 6. This first electrical coupler 28 is elastic along the axial direction of the shaft 6 of the resonator and along a direction perpendicular thereto. Since the support rods 16 are designed to deform symmetrically on either side of the shaft 6, the deformation along the axial direction of the first electrical coupler 28 makes it possible to compensate for any modifications in the distance between the electrode carrier 8 and the base 10 that are caused by accelerations, shocks or differential thermal expansion between the electrode carrier 8 and the base 10.

This first electrical coupler 28 is for example a stud 30, fastened to the base 10, and a spring 32 fastened to the stud 30 and placed in contact with the electrical connection 18.

Electrodes 20 for exciting the resonator 4 and for detecting the vibration of the resonator 4, together with a guard ring (not shown) connected to an electrode 20, are deposited on the electrode carrier 8.

In particular, each electrode 20 extends both over the main face 22 of the electrode carrier, over the end face 24 and over another main face 26 opposite the main face 22. The support rods 16 are fastened to the electrodes 20 of the electrode carrier, for example by conducting adhesive or by soldering.

A second electrical coupler 29, similar to the first electrical coupler 28, is capable of connecting the guard ring of the electrode carrier 8 to the base 10.

The excitation/detection electrodes 20 extend opposite the end face 15 of the resonator. They include a T-shaped portion extending towards the border of the base 10. The guard ring has a central portion extending to the inside of the excitation/detection electrodes 20, at least one peripheral portion extending to the outside of the excitation/detection electrodes 20 and at least one connection extending between the excitation/detection electrodes 20 in order to connect the central portion to the peripheral portion.

The field lines located between the excitation/detection electrodes 20 and the end face 15 enable the vibrations of the resonator to be measured. The field lines located on each side of the end face 15 of the resonator are deflected towards the central portion and the peripheral portion of the guard ring.

The base 10 is provided with four elements 33 for fastening it to the inertial core 11, for example formed by smooth or tapped holes. As a variant, the base 10 is clamped onto the internal core 11. According to another variant, smooth or tapped holes are made in the base 10 in order to fasten the sensor to the inertial core. As a variant, the base 10 is provided with a different number of elements 33 for fastening it to the inertial core 11.

For a square base 10 having a thickness "h", a length side "a" and being fixed at four points spaced from a distance "b" of each border of the base 10, an analytic computing modelling allows to find out that the mechanical parasitic vibration mode vary according to the following equation:

$$F_1 = \frac{h\lambda_1^2}{2\pi a^2} \sqrt{\frac{E}{\rho} * \frac{1}{12*(1-v^2)}}$$

Where h is the thickness of the base 10, a is the length of the side of the base 10, $\lambda_1$ is a parameter which depends from the length's side a and from the distance b, E is the Young modulus of the material of the base 10, $\rho$ is the density of the material of the base 10, $\upsilon$ is the poisson's ratio of the material of the base 10.

The problematic of finding a lightweight gyroscope sensor having a first parasitic vibration mode far from the "useful" vibration mode can be seen as finding the minimum thickness $h_{min}$ such that $F_1 \geq F$. The above equation can be rewritten as follow:

$$h_{mini} = F \frac{2\pi a^2}{\lambda_1^2} * \frac{1}{\sqrt{\frac{E}{\rho} * \frac{1}{12*(1-v^2)}}}$$

Figure 5:
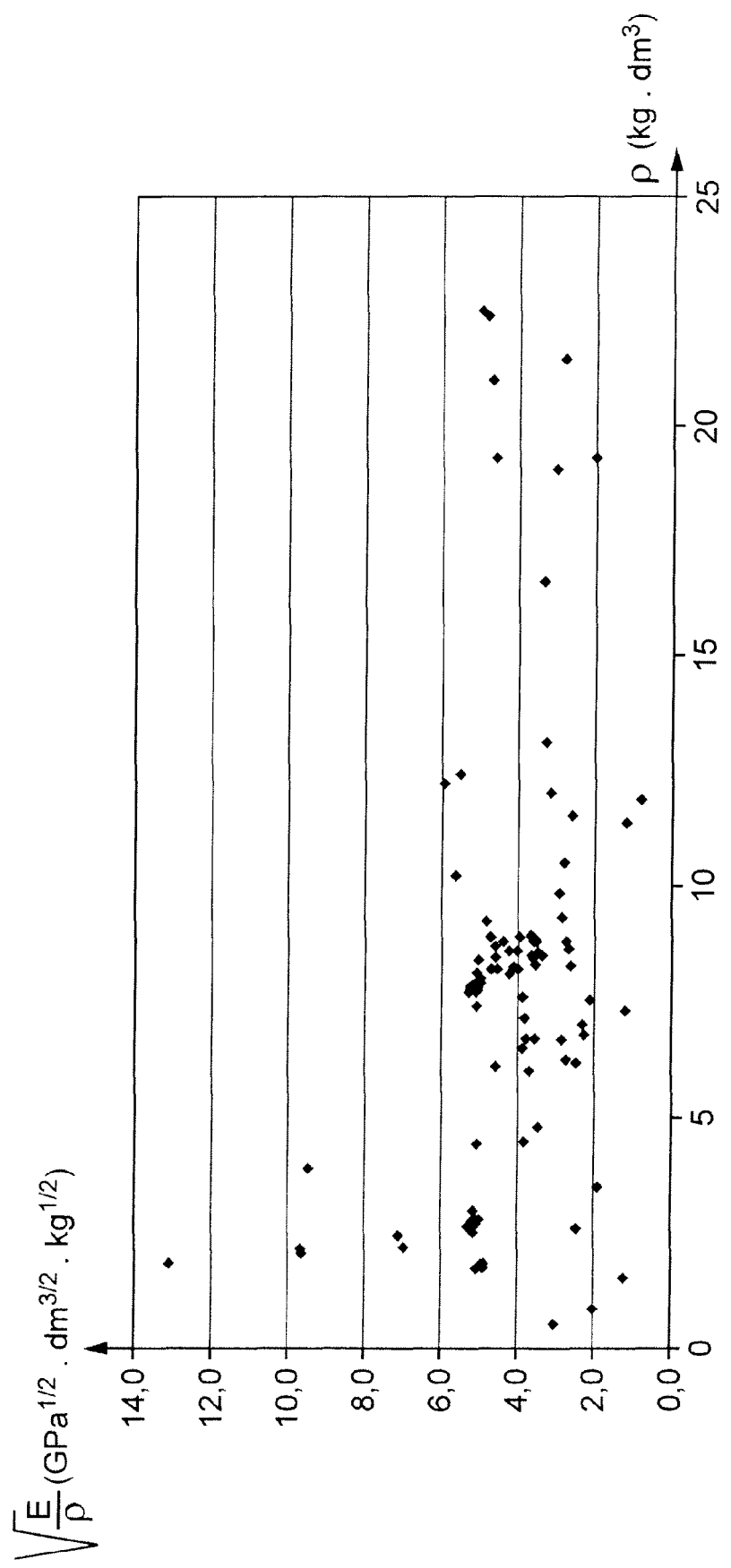
FIG. 5 is a graph illustrating the square root of the ratio of Young's modulus divided by the density according to its density, for different materials and alloys.

Two hundreds different materials and alloys have been tested. Some of the results are visible on FIG. 5. It can be seen on this figure that the gyroscopic sensor would be improved by choosing a material having a density of less than 5 kg/dm³, and the square root of the ratio of Young's modulus divided by said density is greater than 9 GPa$^{1/2}$dm$^{3/2}$kg$^{-1/2}$, i.e.

$$\rho < 5 \text{ kg} \cdot \text{dm}^{-3}$$

$$\sqrt{\frac{E}{\rho}} > 9 \ GPa^{1/2} \cdot \text{dm}^{3/2} \cdot \text{kg}^{-1/2}$$

in which E is the Young's modulus of the material in question and ρ is its density.

Preferably, the density of said material is between 1.5 and 5 and the square root of the ratio of Young's modulus divided by said density is between 9 GPa$^{1/2}$dm$^{3/2}$kg$^{-1/2}$ and 12 Gpa$^{1/2}$dm$^{3/2}$kg$^{-1/2}$, i.e.

$$1,5 \text{ kg} \cdot \text{dm}^{-3} < \rho < 5 \text{ kg} \cdot \text{dm}^{-3}$$

$$9 \ GPa^{1/2} \cdot \text{dm}^{3/2} \cdot \text{kg}^{-1/2} < \sqrt{\frac{E}{\rho}} < 12 \ GPa^{1/2} \cdot \text{dm}^{3/2} \cdot \text{kg}^{-1/2}$$

The use of such a material would reduce the parasitic vibration modes and reducing the mass from two or three and the size of the base of two with respect to other classical materials used for the base 10.

According to a first embodiment of the invention, this material comprises beryllium. Preferably, the base 10 is entirely made of beryllium or of a beryllium alloy. According to this embodiment, the support rods pass right through the base and are sealingly fastened to the base by forming a glass seal.

According to a second embodiment of the invention, this material comprises a ceramic and, preferably, alumina. According to the invention, a ceramic is a vitrified or no vitrified body, of crystalline or partially crystalline structure, or glass, the body of which is formed from essentially inorganic and non-metallic substances, and which is formed by a molten mass that solidifies on cooling or which is formed and taken to maturity, at the same time or subsequently, by the action of heat (ASTM C 242). A distinction is made between oxides, nonoxides (nitrides, carbides, borides etc.) and composite ceramics alloying oxides and nonoxides.

The base 10 advantageously has a thickness of about 4 mm and a mass of about 20 g.

In particular, the base 10 is produced by cofiring ceramic layers, first electrical connections 34, second electrical connections 35 and pins.

Preferably, the ceramic is cofired at high temperature.

As a variant, the ceramic is cofired at low temperature.

The processes used for manufacturing a high-temperature cofired ceramic base and a low-temperature cofired ceramic base are generally called HTCC (High-Temperature Cofired Ceramic) and LTCC (Low-Temperature Cofired Ceramic) processes.

The first electrical connections 34 connect the eight support rods 16, the first electrical coupler 28 and the second electrical coupler 29 to an electronic circuit 36. This electronic circuit 36 is connected to a face 38 of the base, hereinafter called lower face 38, on the opposite side from a face 40 facing the electrode carrier, hereinafter called upper face 40.

Figure 3:
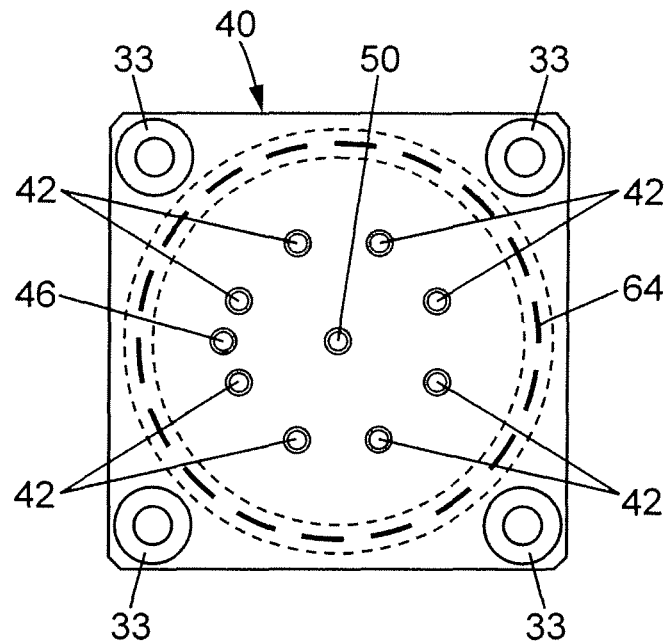
FIG. 3 is a top view of the base of the gyroscopic sensor illustrated in FIG. 1.
Figure 4:
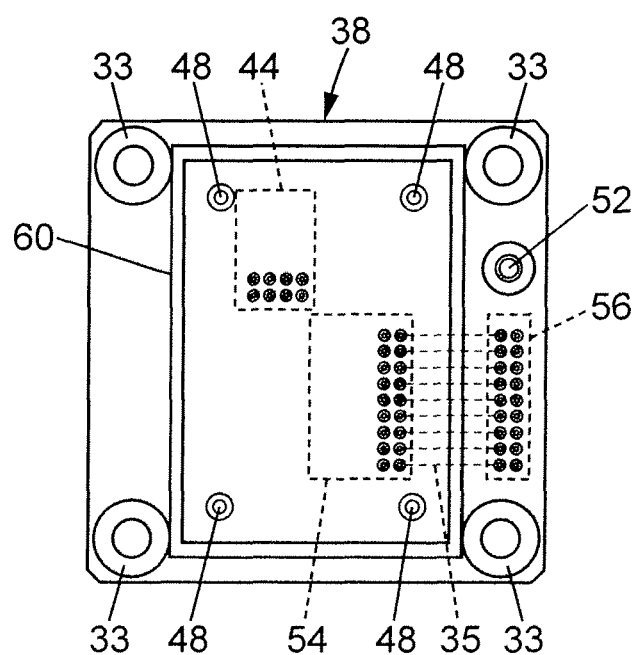
FIG. 4 is a bottom view of the base illustrated in FIG. 1, when said base is not provided with a cover and an electronic circuit.

Referring to FIGS. 3 and 4, the first electrical connections 34 comprise eight electrical contacts 42 emerging on the upper face 40 of the base. These electrical contacts 42 are electrically connected to a first array 44 of eight pins emerging on the lower face 38. The electrical contacts 42 are soldered to the eight support rods 16. The first array 44 of eight pins is connected to the electronic circuit 36 by electrical connection, soldering or ultrasonic bonding (also called ball-bonding or wedge-bonding).

The first electrical connections 34 comprise an electrical contact 46 emerging on the upper face 40. The electrical contact 46 is soldered to the second electrical coupler 29 and is electrically connected to four pins 48 emerging on the lower face 38. The four pins 48 are connected to the electronic circuit 36.

The four pins 48 are also capable of holding the electronic card 36 at a predefined distance from the base 10 so as to be able to place electronic components on either side of the electronic card. As a variant, the pins 48 are replaced with electrical connections and the electronic card is fastened directly to the face 38, for example by adhesive bonding.

Furthermore, the first electrical connections 34 include an electrical contact 50 emerging on the upper face 40. This electrical contact 50 is electrically connected to a pin 52 emerging on the lower face 38. The electrical contact 50 is soldered to the first electrical coupler 28. The pin 52 is intended to receive a high voltage, which will be applied to the end face 15 of the resonator via the first electrical coupler 38.

The second electrical connections 35 integrated into the base 10 (these being shown schematically in FIG. 4) comprise second 54 and third 56 arrays of pins emerging on the lower face 38 of the base. The pins of the second array 54 are electrically and hermetically connected to the pins of the third array 56. The pins of the second array 54 are connected to the electronic circuit 36. The pins of the third array 56 are intended to be connected to a connector external to the gyroscopic sensor 2.

As a variant, some of the pins of the array 56 may also serve for mechanical retention of said external connector against the base 10.

The gyroscopic sensor 2 further includes a package 58 for protecting the electronic circuit 36. This package 58 comprises a frame 60 soldered to the lower face 38 of the base, and a lid 62 fastened to the frame 60. This package 58 enables the electronic circuit 36 to be maintained in a controlled atmosphere.

The frame 60 of the package 58 extends only over a portion of the lower face 38 of the base. The package 58 is designed to contain the electronic circuit 36, first 44 and second 54 arrays of pins, and also the pins 48. The third array of pins 56 and the pin 52 are placed on the outside of the package 58.

As a variant, the arrays of pins 44, 54 and 56 are replaced with metalized pads.

Electrical connection means 20, 29, 33, 34, 35, 48 enable the electrical ground of the gyroscopic sensor 2 to be connected to the electrical ground of the core 11. In particular, a guard ring deposited on the electrode carrier 8, the electronic circuit 36, the package 58, the cover 12, and the second 54 and third 56 arrays of pins are connected to the electrical ground of the inertial core 11 via certain electrodes 20, the second electrical coupler 29, certain electrical connections 34, 35, fastening elements 33 and pins 48. These elements connected to ground create a "Faraday cage" designed to ensure that the gyroscopic sensor can operate in an environment comprising electromagnetic waves.

Advantageously, the gyroscopic sensor 2 may be easily tested via connections, especially connections to the first array of pins 44, when the lid 62 is not fitted onto the frame 60. Then, when the gyroscopic sensor has been tested, the electronic circuit 36 is connected to the pins of the base and the lid 62 is fastened to the frame 60.

Advantageously, the base is manufactured as a single part and the support rods 16 do not pass through the base 10, so that said base is completely sealed.

Advantageously, by soldering the end of the support rods 16 to the plane upper face 40 of the base it is possible for the vibration modes of the support rods to be better controlled.

Advantageously, the use of a cofired ceramic base enables the array of pins 44 to be freely positioned so as to reduce the footprint of the electronic cards 36.

In the gyroscopic sensor of the state of the art, the support rods pass right through the base and are sealingly fastened to the base by forming a glass seal, i.e. by melting a drop of glass between the support rod and an orifice made in the base. The place where the drops of molten glass solidify on cooling cannot be precisely controlled. However, the vibration frequency of the support rods depends on the place where the support rods are fastened to the base. This vibration frequency influences the rotation angle measurement made by the gyroscopic sensor when it is subjected to vibrations or shocks.

In the vibrating gyroscopic sensor, this vibration frequency is generally several kHz (for example 3 kHz) and must be precisely controlled, for example to ±100 Hz. Since the position where the drops of glass solidify cannot be precisely controlled in the gyroscopic sensor of the state of the art, the vibration frequency of each support rod may be different. As a consequence, the vibrating frequency cannot be corrected easily by processing electronics of the gyroscope sensor of the state of the art. Furthermore, it is difficult to well seal the base of the gyroscopic sensor of the state of the art given the number of support rods passing through it and the difficulty of obtaining a perfect glass seal.

It is also another object of the invention to provide a gyroscopic sensor improving at least one of the above mentioned problems.

For this latter purpose, the subject of the invention is a gyroscopic sensor comprising:
a sensitive element 4 suitable designed to vibrate;
an electrode carrier 8 capable of carrying excitation electrodes 20 and detection electrodes 20 for detecting the vibration of the sensitive element; and
elements 10,16 for supporting the electrode carrier;
characterized in that the supporting elements 10, 16 comprise a base 10 made of an insulating material, and in that electrical connections 34, 35 are integrated into the base 10.

The electrical connection 34 pass through the base 10 but are not surrounded by any other material than the material of the base. The integration of the electrical connections 34 is performed by methods used for manufacturing integrated circuit like high-temperature cofiring or by low-temperature cofiring. The base 10 is integral, ie monobloc. Thus, the base 10 is all in one piece. It is not traversed by support rods or any other vias. Consequently, the vibratory frequency of the support rods does no more influence the measure of the rotation angle performed by the gyroscopic sensor. Advantageously, the base 10 is more seal. Advantageously, the manufacturing process of the gyroscope sensor is simplify and therefore less expensive.

The base 10 of this gyroscopic sensor can be made of a material which has not:
a density of less than 5 kg/dm$^3$, and
a square root of the ratio of Young's modulus divided by said density is greater than 9 GPa$^{1/2}$dm$^{3/2}$kg$^{-1/2}$.

For instance, the base 10 can be made of ceramic like for example the material sold with the registered trademarks "Dupont 951" and "Dupont 943" and metal composite like for example "Ferro A6M" and "Ferro A6S".

The embodiments above are intended to be illustrative and not limiting. Additional embodiments may be within the claims. Although the present invention has been described with reference to particular embodiments, workers skilled in the art will recognize that changes may be made in form and detail without departing from the spirit and scope of the invention.

Various modifications to the invention may be apparent to one of skill in the art upon reading this disclosure. For example, persons of ordinary skill in the relevant art will recognize that the various features described for the different embodiments of the invention can be suitably combined, un-combined, and re-combined with other features, alone, or in different combinations, within the spirit of the invention. Likewise, the various features described above should all be regarded as example embodiments, rather than limitations to the scope or spirit of the invention. Therefore, the above is not contemplated to limit the scope of the present invention.

The invention claimed is:

1. A gyroscopic sensor comprising:
a sensitive element having a hemispherical or bell shape; the sensitive element being designed to vibrate;
an electrode carrier capable of carrying a plurality of excitation/detection electrodes for exciting the sensitive element and for detecting the vibration of the sensitive element; and
a plurality of supporting elements for supporting the electrode carrier;
wherein the supporting elements comprise a base made of a material having a density of less than 5 kg/dm$^3$, and the square root of the ratio of Young's modulus divided by said density is greater than 9 GPa$^{1/2}$dm$^{3/2}$kg$^{-1/2}$.

2. The gyroscopic sensor according to claim 1, in which said base material has a density being between 1.5 kg/dm$^3$ and 5 kg/dm$^3$, and the square root of the ratio of Young's modulus divided by said density is between 9 GPa$^{1/2}$dm$^{3/2}$kg$^{-1/2}$ and 12 GPa$^{1/2}$dm$^{3/2}$kg$^{-1/2}$.

3. The gyroscopic sensor according to claim 1, in which said base material comprises beryllium.

4. The gyroscopic sensor according to claim 1, in which said base material comprises a ceramic.

5. The gyroscopic sensor according to claim 4, in which the ceramic is alumina.

6. The gyroscopic sensor according to claim 4, in which the ceramic is cofired.

7. The gyroscopic sensor according to claim 6, in which the base is produced by a high-temperature cofiring of ceramic layers and integrated electrical connections.

8. The gyroscopic sensor according to claim 6, in which the base is produced by a low-temperature cofiring of ceramic layers and integrated electrical connections.

9. The gyroscopic sensor according to claim 1, which includes a plurality of electrical connections integrated into the base and an electronic circuit electrically connected to the electrical connections.

10. The gyroscopic sensor according to claim 9, in which the supporting elements comprise conducting support rods interposed between the base and the electrode carrier, said support rods being, on one side, soldered to an electrical contact of the electrical connections and, on the other side, connected to the excitation/detection electrodes of the electrode carrier.

11. The gyroscopic sensor according to claim 9, which includes a package for protecting the electronic circuit soldered to the base.

12. The gyroscopic sensor according to claim 11, in which the base includes an internal package array of pins emerging on an inside of the package and an external package array of additional pins emerging on an outside of the package, and in which at least some of said electrical connections of the base are capable of interconnecting the internal package array of pins to the external package array of additional pins.

13. The gyroscopic sensor according to claim 12, said sensor being designed to be fastened to an inertial core, said sensor comprising:
   a guard ring deposited on the electrode carrier; and
   electrical connection means for connection between said guard ring and either the electronic circuit or said package, or both the electronic circuit and said package, said electrical connection means being connected to the electrical ground of the inertial core.

14. The gyroscopic sensor according to claim 1, said sensor being designed to be fastened to an inertial core, said sensor comprising a cover fastened to the base, said cover being connected to an electrical ground of the inertial core.

15. The gyroscopic sensor according to claim 1, which includes at least one elastic electrical coupler along an axial direction, said coupler being placed between the electrode carrier and the base.

16. The gyroscopic sensor according to claim 1, said sensor being designed to be fastened to an inertial core via a plurality of fastening elements.

17. A gyroscopic sensor comprising:
   a sensitive element having a hemispherical or bell shape; the sensitive element being designed to vibrate;
   an electrode carrier capable of carrying a plurality of excitation/detection electrodes for exciting the sensitive element and for detecting the vibration of the sensitive element; and
   a plurality of supporting elements for supporting the electrode carrier; wherein the supporting elements comprise a base made of beryllium having a density of less than 5 kg/dm$^3$, and the square root of the ratio of Young's modulus divided by said density is greater than 9 GPa$^{1/2}$dm$^{3/2}$kg$^{-1/2}$.

* * * * *